Aug. 18, 1936.  D. G. LORRAINE  2,051,307

FLOW BEAN

Filed July 21, 1931

INVENTOR.
David G. Lorraine,
BY
R. W. Smith
ATTORNEY.

Patented Aug. 18, 1936

2,051,307

UNITED STATES PATENT OFFICE 2,051,307

FLOW BEAN

David G. Lorraine, Los Angeles, Calif., assignor of one-half to W. L. Borough and one-half to Sara R. Lorraine Application July 21, 1931, Serial No. 552,097

4 Claims. (Cl. 251—167)

It is the object of this invention to provide a flow bean particularly applicable for controlling the flow from oil and gas wells and comprising a cooperating throat and tapering valve adapted for ready replacement without disturbing the pipe line and so mounted as to eliminate chattering and insure accurate alinement of the co-operating throat and valve.

It is a further object of the invention to mount the throat and its cooperating valve so that inadvertent bending of the pipe line will not shift the throat and valve out of alinement.

It is a still further object of the invention to adjustably restrict the orifice of the throat without in any way obstructing the flow beyond the restriction, thereby avoiding sanding-up or cutting-out of the bean, and eliminating flow disturbance and thus reducing emulsion.

It is a still further object of the invention to provide a construction whereby the flow may be cushioned as it enters the bore of the throat, thereby avoiding cutting-out the bore at its intake end which is the portion thereof otherwise subjected to the greatest wear.

Further objects of the invention will be readily understood from the following description of the accompanying drawing, in which.

Figure 1:
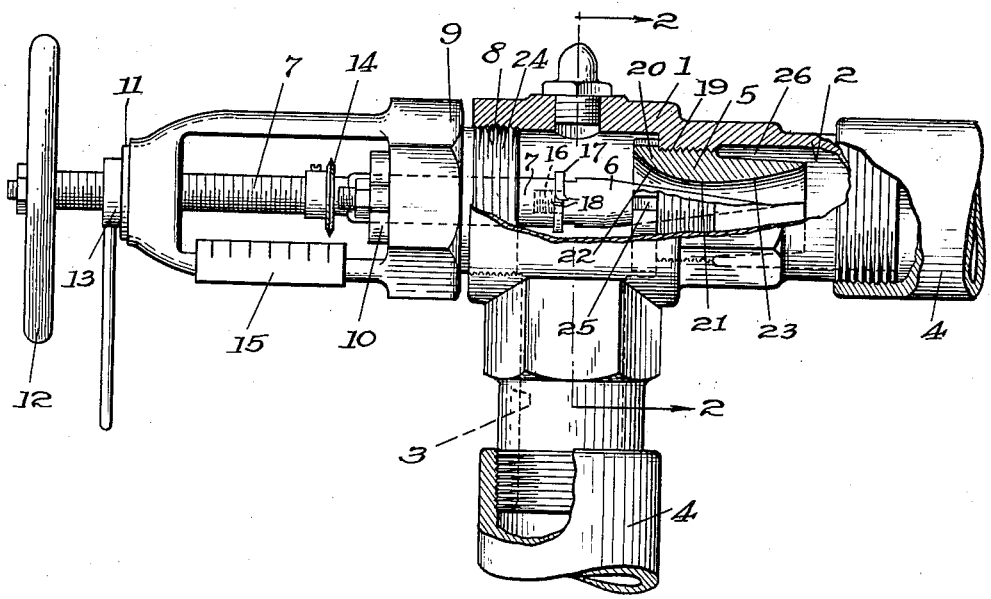
Fig. 1 is a side elevation of the flow bean, partly broken away in axial section.
Figure 2:
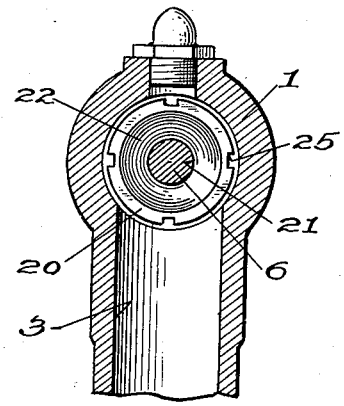
Fig. 2 is a transverse section on the line 2—2 of Fig. 1.

The flow bean comprises a casing 1, shown as a T-fitting or cruciform head having nipples 2 and 3 adapted for threaded engagement with pipes or conduits 4 and 4a respectively. A throat or choke collar 5 is mounted in nipple 2, with a cooperating tapering valve 6 axially alining with the throat and connected to a valve stem 7 which projects rearwardly through an opposite lateral port 8 of the T-fitting. The valve stem is mounted in a sleeve plug terminating in a yoke 9 which projects rearwardly from port 8 of the T-fitting, with the valve stem preferably packed-off by a usual packing gland 10 and the outer end of the valve stem threaded through a bushing 11 for longitudinal adjustment of the valve stem by rotating a hand wheel 12. The valve stem may be releasably fixed in longitudinally adjusted position by means of a locking nut 13, and its longitudinal adjustment may be indicated by a collar 14 which is fixed on the valve stem for cooperation with a graduated scale 15 carried by the yoke.

The yoke, together with valve 6 and its stem 7, is thus readily removable without disturbing conduit 4, and when the yoke is removed the throat 5 which is of smaller diameter than the port 8 is adapted for withdrawal and replacement through said open port of the T-fitting without disturbing the conduits 4 or 4a, and the valve 6 is adapted for replacement by providing a threaded connection 16 between the valve and its stem.

The threaded connection 16 may be locked by a split washer 17 having its ends oppositely bent for reception in cooperating notches 18 in the proximate surfaces of the valve and its stem; and the throat 5 may be releasably held in operative position in the T-fitting by means of a threaded engagement 19, with a head 20 of the throat adapted for engagement by a suitable tool for tightening or releasing said threaded engagement.

The throat 5 is elongated so that its bore is adapted to direct the flow for an appreciable distance before and after the point of maximum restriction produced by the cooperating valve 6, in order that the flow may be gradually instead of abruptly restricted; and the elongated throat is adapted for mounting in casing 1 so as to eliminate the possibility of chattering, and without the possibility of the throat being moved out of exact alinement with its cooperating valve as a result of any bending tendency of the pipe line 4 which is connected to the nipple 2.

For this purpose the threads 19 are provided on that end of throat 5 which is adjacent its head 20 and extend an appreciable distance along the throat, so that when the throat is threaded into the bore of nipple 2, with the head 20 abutting against a cooperating shoulder of the bore, the throat is positively supported along the entire length of its rear end portion except for the longitudinally restricted length of the rearwardly projecting head 20. The throat is thus positively supported against any possibility of chattering as is liable to occur if any appreciable length of the throat projects rearwardly beyond its supporting engagement with the bore of nipple 2. The forward end of the throat, which due to the elongated threaded engagement 19 at its rear end may be loosely received in the bore of nipple 2 without liability of the throat chattering, preferably terminates short of the threads 4a which are formed on the nipple, so that any bending tendency of the pipe 4 which is threaded to nipple 2, is not transmitted to the throat and the latter is supported to the integral and rigid T-fitting at a point sufficiently longitudinally spaced from the threaded connection for the pipe that any bending tendency of pipe 4 will not bend that portion of the rigid fitting which engages the throat.

The throat and its cooperating valve are also mounted so that the T-fitting may be of restricted length while still providing the desired elongated threaded engagement 19 for the throat and supporting the valve stem 7 so as to insure accurate alinement of the valve with the throat without obstructing flow through the T-fitting between nipple 3 and the inner end of the bore of the throat. For this purpose the threaded engagement 19 for the throat 5 as well as the threaded engagement 24 for the yoke 9, are so positioned that the throat 5 is at one side of the longitudinal passageway or bore which is formed by the nipple 3, and the valve stem 7 is guided and supported throughout its entire length except for the relatively short distance across this longitudinal bore between the inner end of the yoke and the inner end of throat 5. In other words the throat 5 in which valve 6 is received and the yoke 9 which guides the stem 7 of the valve, are short-coupled in the cross bore of the T-fitting, i. e. the inner end of the yoke is spaced from the inner end of the throat only the distance necessary to clear the diameter of the longitudinal bore of the T-fitting. As a consequence flow through the T-fitting between nipple 3 and the inner end of throat 5 is non-obstructed, but at the same time only a very short length of stem 7 and valve 6 is left unsupported between the guide yoke 9 and the cooperating throat 5.

The bore of throat 5 cooperates with tapering valve 6 so as to provide any desired restriction in the flow by longitudinally adjusting the tapering valve; and the bore of the throat is so arranged as to gradually restrict the flow toward the minimum area of the orifice, and then relieve said restriction relatively shortly, if not substantially immediately beyond said point of maximum restriction. For this purpose the minimum cross-sectional area of the bore of the throat is at a point 21 spaced longitudinally from the respective ends of the bore, and the bore divergently tapers at 22 and 23 toward the respective ends of the throat, with the tapering portions 22 and 23 preferably starting substantially immediately beyond the maximum restriction 21, and in any event starting only a relatively short distance beyond said point of maximum restriction. It will thus be seen that the cross-sectional area of the flow is appreciably increased substantially immediately beyond point 21 as a result of the divergence of the end of the bore starting substantially immediately beyond said point; and restriction of the flow beyond point 21 is thus appreciably and substantially immediately relieved so as to avoid the possibility of sanding-up or cutting-out of the bean, with said appreciable and substantially immediate increase in the cross-sectional area of the bore eliminating disturbance of the flow such as might tend to cause emulsion.

A fluid cushion is provided at the annular space between the bore of nipple 2 and the forward end of the throat which is loosely received therein, whereby violent surging of fluid in said annular space is prevented and cutting-out by sand or the like is thus avoided. As an instance of such fluid cushion the outer end of the throat beyond the threads 19 may be of restricted diameter and the surrounding bore of the T-fitting may be of increased diameter so as to form an appreciable annular space 26 surrounding the outer end of the throat and extending an appreciable longitudinal distance corresponding to the elongated non-threaded outer end of the throat; and the bore of the pipe 4 which is connected to nipple 2 is of appreciably greater diameter than the external diameter of said outer end of the throat so as to communicate freely with the space 26 in order that it may be filled with fluid. When the flow is through the bore of the throat and thence into the bore of pipe 4, the enlarged bore of said pipe also provides an effective expansion space avoiding restriction in the flow beyond the throat. The space 26 is of a radius appreciably greater than merely a slight clearance space such for example as would result from simply discontinuing the threads 19. As an instance of this arrangement the external diameter of the outer end of the throat is restricted to a greater degree than merely the depth of the threads 19, and/or the surrounding bore of the nipple 2 is enlarged to a greater degree than merely the depth of said threads. The space 26 is thus adapted to receive more than mere seepage of fluid, and is of a radius to receive an appreciable body of fluid such as will form an efficient fluid cushion. The fluid constituting this cushion is trapped in the space 26, since the threaded engagement 19 closes the inner end of said space, and the outer end of the throat 5 and the surrounding wall of the bore of nipple 2 respectively define the inner and outer peripheries of said cushion space along its entire length, with only the outer end of the cushion space open to the fluid flowing through the bean and its pipe connections.

For the purpose of inspection and cleaning, the upper end of the longitudinal bore of the head 1 may be closed by a removable plug 30.

In order to further avoid cutting-out by sand, the head 20 of the throat which is adapted for engagement by a suitable tool, preferably has its recesses 25 which are engaged by the cooperating tool, positioned where they are clear of the bore of the throat so as to avoid channeling; and for this purpose the recesses 25 are shown as notches cut in the outer periphery of head 20 and radially spaced from the bore of the throat, with said notches adapted for engagement by a suitable tool (not shown) having cooperating prongs adapted to engage the notches for rotating the throat.

The invention thus provides an extremely efficient adjustable flow bean, with the throat and its cooperating valve readily replaceable without disturbing the pipe line, and said valve and throat short-coupled without obstructing flow through the bean and thereby insuring accurate alinement of the valve and throat, and the throat positively supported for an appreciable distance along its inner end so as to avoid chattering, and the throat mounted so that the flow may be cushioned, with the bore of the throat gradually restricting the flow and then substantially immediately relieving said restriction independently of the cooperating valve which merely adjusts the cross-sectional area of the orifice at the point of maximum restriction.

I claim:

1. In a flow bean, a casing having a longitudinal bore and a cross bore communicating therewith at one side of the longitudinal bore, a throat, the inner end of the throat having an abutment head extending only a short distance longitudinally of the throat, an appreciable length of the inner end portion of the throat and the wall of the cross bore being threaded for removably mounting the throat in the cross bore with the abutment head engaging the wall of the casing which surrounds the cross bore, the parts being so arranged that when the throat is mounted in the cross bore the abutment head is adjacent but clears the longitudinal bore, the outer end of the throat and the surrounding wall of the cross bore comprising cooperating elements defining a radial space therebetween formed by laterally offsetting the surface of at least one of said elements to a depth appreciably greater than the depth of said threads so as to form a cushion space of appreciable radial width surrounding the outer end of the throat, said cushion space being closed along its entire length by said cooperating elements, and being closed at its inner end by the threaded engagement between the inner end of the throat and the wall of the cross bore, and being open at its outer end to flow through the flow bean, means at the outer end of the cross bore whereby a pipe which has a bore of appreciably greater diameter than the external diameter of the throat may be connected to the cross bore, the casing having a port in alinement with the cross bore at the opposite side of the longitudinal bore, a valve cooperating with the inner end of the throat, a stem for the valve, and a guide for the stem removably mounted in said port with its inner end adjacent but clearing the longitudinal bore, the external diameter of the throat being less than the diameter of said port whereby when the guide is removed the throat may also be removed through said port.

2. In a flow bean, a casing having a longitudinal bore and a cross bore communicating therewith at one side of the longitudinal bore, a throat, the inner end of the throat having an abutment head extending only a short distance longitudinally of the throat, an appreciable length of the inner end portion of the throat and the wall of the cross bore being threaded for removably mounting the throat in the cross bore with the abutment head engaging the wall of the casing which surrounds the cross bore, the parts being so arranged that when the throat is mounted in the cross bore the abutment head is adjacent but clears the longitudinal bore, the outer end of the throat and the surrounding wall of the cross bore comprising cooperating elements defining a radial space therebetween formed by laterally offsetting the surface of at least one of said elements to a depth appreciably greater than the depth of said threads so as to form a cushion space of appreciably radial width surrounding the outer end of the throat, said cushion space being closed along its entire length by said cooperating elements, and being closed at its inner end by the threaded engagement between the inner end of the throat and the wall of the cross bore, and being open at its outer end to flow through the flow bean, the casing having a port in alinement with the cross bore at the opposite side of the longitudinal bore, a valve cooperating with the inner end of the throat, a stem for the valve, and a guide for the stem removably mounted in said port with its inner end adjacent but clearing the longitudinal bore.

3. In a flow bean, a casing having a longitudinal bore and a cross bore communicating therewith at one side of the longitudinal bore, a throat, the inner end of the throat having an abutment head, the throat being mounted in the cross bore with the inner end portion of the throat engaging the wall of the cross bore and with the abutment head adjacent but clearing the longitudinal bore and engaging the wall of the casing which surrounds the cross bore, the outer end of the throat and the surrounding wall of the cross bore cooperating to define a cushion space therebetween, open at its outer end to flow through the flow bean, the casing having a port in alinement with the cross bore at the opposite side of the longitudinal bore, a valve cooperating with the throat, a stem for the valve extending across the longitudinal bore, and a guide for the stem mounted in the port with its inner end adjacent but clearing the longitudinal bore.

4. In a flow bean, a casing having a longitudinal bore and a cross bore communicating therewith at one side of the longitudinal bore, a throat mounted in the cross bore with the inner end of the throat engaging the wall of the cross bore and adjacent but clearing the longitudinal bore, the outer end of the throat and the surrounding wall of the cross bore cooperating to define a cushion space therebetween, open at its outer end to flow through the flow bean, the casing having a port in alinement with the cross bore at the opposite side of the longitudinal bore, a valve cooperating with the throat, a stem for the valve extending across the longitudinal bore, and a guide for the stem mounted in the port with its inner end adjacent but clearing the longitudinal bore.

DAVID G. LORRAINE.